United States Patent [19]
Jung

[11] Patent Number: 5,805,904
[45] Date of Patent: Sep. 8, 1998

[54] POWER CONTROL CIRCUIT OF AT LEAST ONE COMPUTER EXPANSION SLOT

[75] Inventor: Sung-Ho Jung, Seoul, Rep. of Korea

[73] Assignee: Samsung Electronics Co., Ltd., Suwon, Rep. of Korea

[21] Appl. No.: 677,369

[22] Filed: Jul. 5, 1996

[30] Foreign Application Priority Data

Jul. 7, 1995 [KR] Rep. of Korea ............... 95-19942

[51] Int. Cl.[6] ........................................ G06F 1/26
[52] U.S. Cl. ............................ 395/750.01; 395/282
[58] Field of Search .................... 395/750, 283, 395/750.01–750.08, 282, 81, 83

[56] References Cited

U.S. PATENT DOCUMENTS

| | | |
|---|---|---|
| 4,051,326 | 9/1977 | Badagnani et al. ............ 395/750 |
| 5,305,459 | 4/1994 | Rydel ............................. 395/750 |
| 5,339,445 | 8/1994 | Gasztonyi ....................... 395/750 |
| 5,396,636 | 3/1995 | Gallagher et al. ............... 395/750 |
| 5,440,748 | 8/1995 | Sekine et al. .................... 395/750 |
| 5,475,271 | 12/1995 | Shibasaki et al. .............. 395/750 |
| 5,581,712 | 12/1996 | Herrman ........................ 395/283 |
| 5,613,130 | 3/1997 | Teng et al. ..................... 395/283 |
| 5,652,892 | 7/1997 | Ugajin ........................... 395/750 |

*Primary Examiner*—Ayaz R. Sheikh
*Assistant Examiner*—David A. Wiley
*Attorney, Agent, or Firm*—Jones & Volentine, L.L.P.

[57] ABSTRACT

A power control circuit for at least one expansion slot has a latching means for receiving and storing data from the system and a means for outputting a signal corresponding to the data provided by a control signal, a power controller for receiving the control signal from the latching means and for outputting a control power on or power off signal corresponding to the signal from the latching means and at least one expansion slot for which the power is supplied or denied according to the on or off signal from the power controller.

6 Claims, 1 Drawing Sheet

| SD7 | SD6 | SD5 | SD4 | SD3 | SD2 | SD1 | SD0 | HEX | SLOT NO. |
|---|---|---|---|---|---|---|---|---|---|
| 1 | 1 | 1 | 1 | 1 | 1 | 1 | 0 | FE | S1 |
| 1 | 1 | 1 | 1 | 1 | 1 | 0 | 1 | FD | S2 |
| 1 | 1 | 1 | 1 | 1 | 1 | 0 | 0 | FC | S1,S2 |
| 1 | 1 | 1 | 1 | 1 | 0 | 1 | 1 | FB | S3 |
| 1 | 1 | 1 | 1 | 1 | 0 | 1 | 0 | FA | S1,S3 |
| 1 | 1 | 1 | 1 | 1 | 0 | 0 | 1 | F9 | S2,S3 |
| 1 | 1 | 1 | 1 | 1 | 0 | 0 | 0 | F8 | S1,S2 S3 |
| 1 | 1 | 1 | 1 | 1 | 1 | 1 | 1 | FF | ALL OFF |

POWER CONTROL CIRCUIT OF AT LEAST ONE COMPUTER EXPANSION SLOT

BACKGROUND OF THE INVENTION

(1) Field of the Invention

The present invention relates to a power control circuit for at least one computer expansion slot in a computer system. More particularly, the present invention relates to a circuit for controlling the power of used and unused expansion slots in order to reduce power consumption and to prevent undesired or incorrect operations caused by signal interference which results when several expansion slots are simultaneously used in the same environment.

(2) Description of the Prior Art

The existence of several expansion slots for inserting and using option cards is a convenient way for users to expand the capabilities of conventional computer system equipment. The existing system can be expanded quickly and efficiently by simply adding one or more option cards by insertion into an available slot, and thereby instantly providing additional capabilities to the system.

However, the conventional expansion slots are designed to receive power automatically when the computer is turned on even when option cards are not being used in the slots. This brings about unnecessary power-consumption and potentially undesired electromagnetic interference. Indeed, conventional computers often do not work well or even at all due to signal interference caused by such option cards when a plurality of option cards fixed in a plurality of expansion slots use the same input-output address or interrupt level.

SUMMARY OF THE INVENTION

An object of the present invention is to minimize or solve one or more of such problems of the prior art identified above.

The present invention reduces a computer system's power-consumption by controlling the power to a plurality of used and unused expansion slots. It further provides a means to control the power to such plurality of slots if several option cards are occupying the slots in a computing device such as a personal computer.

The present invention, also prevents incorrect or undesired operations in a computer device caused by signal interference. Typically, such interference is generated when a plurality of option cards installed in a plurality of expansion slots are simultaneously used within a computer device and the plurality of such cards utilize the same input-output address and interrupt levels.

In order to achieve one or more of the above objects, the present invention provides a power control circuit for at least one expansion slot for a computer system, wherein said circuit comprises:

a latching means adapted for receiving, storing and outputting a data value directed to said system hardware or software according to a control signal that it receives;

a power controller for receiving a signal from the latching means and for outputting a control power on or control power off signal directed to an expansion slot in a computing device; and at least one expansion slot in a computer device having its power source adapted to receive a remote power on or off signal transmitted from the power controller and to respond by turning the power on or off to the at least one expansion slot.

DETAILED DESCRIPTION OF THE PREFERRED EMBODIMENTS

Figures 1, 2:
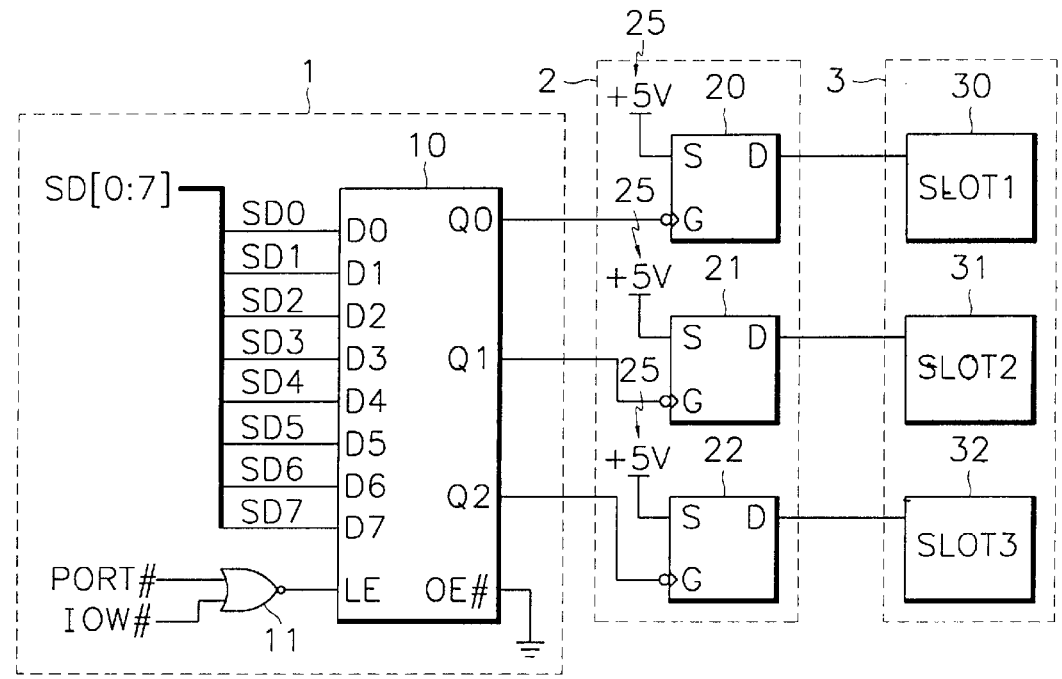
FIG. 1 is a circuit diagram of the power control circuit of a computer expansion slot in accordance with a preferred embodiment of the present invention.
FIG. 2 is a diagram of data values useful in a control table with a means for regulating the control of power and latching it on or off for at least one expansion slot in a computer system in accordance with a preferred embodiment of the present invention.

The present invention will be more clearly understood by a detailed description of a preferred embodiment, particularly when viewed in light of the accompanying drawings. A preferred embodiment may be described as follows.

FIG. 1 is a circuit diagram in accordance with a preferred embodiment of the present invention.

FIG. 2 is a diagram of data values for being stored in or available to a means for controlling and for latching the power on and off to at least one expansion slot in a computer system in accordance with a preferred embodiment of the present invention.

As shown in FIG. 1, the power control circuit for at least one computer expansion slot, in accordance with a preferred embodiment of the present invention, includes a latching block 1 adapted for receiving and storing data SD0, SD1, ... and SD7 from the system according to the input of a control signal. The latching block 1 is also provided with a means for outputting power control signals corresponding to the data provided to it by a control signal.

The power control circuit of FIG. 1 also includes a power controller 2 having a means for outputting a power on or power off control signal according to the data which it receives from the latching block 1, and at least one expansion slot block 3 in which the power may be supplied or denied according to a power on or power off signal sent from the power controller 2.

The latching block 1 has at least one NOR gate 11 and a latching buffer 10. The NOR gate 11 receives a port address signal PORT# and an input-output write signal IOW # from the system through a first input terminal and a second input terminal respectively, and then, outputs a signal corresponding to the signals PORT# and IOW#. The latching buffer 10 stores the data transmitted through the system data buses and outputs signals corresponding to the data according to an output of control signal OE#.

The power controller 2 includes a plurality of field effect transistors (FETs) 20, 21, and 22, wherein each of the FETs has a gate terminal G respectively connected to the output terminals of the latching buffer 10. Source terminals S are connected to the external power source 25, and drain terminals D are respectively connected to the expansion slots 30, 31, and 32.

In accordance with a preferred embodiment of the present invention, the operation of the power control circuit at least one computer expansion slot is described below with reference to FIG. 1.

The port address signal PORT# and the input-output write signal IOW# established by the system are respectively transmitted to the first inputting terminal and the second input terminal of the NOR gate 11.

The NOR gate 11 outputs, through the output terminal, a signal corresponding to the port address signal PORT# and the input-output write signal IOW#.

At such time, the computer system outputs data through the system data bus which is provided to control the power of the expansion slots 30, 31 and 32. The data is predetermined by the slots for which the power is to be turned on or cut off as shown in FIG. 2.

The latching buffer 10 is enabled when a signal is received from the NOR gate 11, and then the buffer 10 stores the data transmitted from the system data bus.

The latching buffer 10 outputs the signal corresponding to the data through an output terminal responding to the signal OE#.

Only those gate terminals G of the field effect transistors 20, 21, and 22 that receive the output signals from the latching buffer 10 are activated when a low level signal is inputted.

Therefore, when the low level signal is inputted into the particular gate terminal G of the field effect transistor 20, 21, or 22, the respective field effect transistor is activated and interrupts the current which is being transmitted from a source terminal to a drain terminal. Ultimately, the power being transmitted from the drain terminal into the target expansion slots 30, 31 or 32 is turned off.

When the power outputted from a drain terminal of the field effect transistors 20, 21, and 22 is off, the power is not permitted to be transmitted to the respective expansion slots 30, 31 or 32 that is connected to that particular drain terminal.

For example, a method for turning off a first slot 30 and a third slot 32 may be described as follows.

Providing a port address signal PORT# and an input-output write signal IOW# at a low level causes the output signal of the NOR gate 11 to be high.

By way of the system data buses, the computer system outputs 11111010 corresponding to the value FA in HEX as shown in FIG. 2.

The latching buffer 10 is activated by the high level signal from the NOR gate 11 and receives the FA value in HEX through the system data buses.

The latching buffer 10 storing the data values in HEX outputs signals corresponding to data in HEX into the field effect transistors 20, 21, and 22 through an output terminal because the output control signal, which is activated by a low level signal, is grounded.

The first field effect transistor 20 and the third field effect transistor 22 interrupt power transmitted to the expansion slots 30 and 32, respectively, which caused the first expansion 30 and the third expansion slot 32 to be turned off. At such time, the second expansion slot 31 remains turned on and the option card in slot 31 can be used.

The above-stated operation provides a means for selectively cutting off the current directed to expansion slots whose option cards use the same input-output address and interrupt level. Thus, the above invention provides an efficient means to prevent undesired and incorrect operations by an option card which are caused by signal interference from other option cards in such a computer device.

Therefore, in accordance with the preferred embodiment of the present invention, the power control circuit for at least one computer expansion slot reduces power consumption by controlling the power of unused expansion slots. Accordingly, it minimizes or prevents undesired or incorrect-operations from option cards caused by signal interference even when several option cards are installed in related expansion slots in a computer device such as in a personal computer.

While this invention has been described with respect to that which is presently considered to be the most practical and preferred embodiments, it is to be understood that the invention is not limited to the disclosed embodiments. On the contrary, it is intended that the present invention cover various modifications and equivalent arrangements within the spirit and scope of the appended claims.

What is claimed is:

1. A power control circuit for controlling power provided to expansion slots for a computer system comprising:

a power source;

a plurality of expansion slots, attached to the computer system; and latching means for receiving and storing data from the computer system and outputting a plurality of control signals corresponding to the data received, each of the plurality of control signals indicating a power-off state or a power-on state for a corresponding expansion slot of the plurality of expansion slots;

a power controller, connected between the power source and the plurality of expansion slots and controlled by the plurality of control signals, wherein the power controller connects a chosen expansion slot of the plurality of expansion slots to the power source when a corresponding control signal of the plurality of control signals indicates a power-on state, and disconnects the chosen expansion slot of the plurality of expansion slots from the power source when the corresponding control signal of the plurality of control signals indicates a power-off state.

2. The power control circuit as defined in claim 1, wherein the latching means comprises:

at least one NOR gate for receiving a port address signal and an input-output write signal from the computer system and a means for outputting a latching signal corresponding to the port address signal and the input-output write signal; and a latching buffer for storing data transmitted from the system and a means for outputting the plurality of control signals.

3. The power control circuit as defined in claim 1, wherein the power controller comprises:

a plurality of field effect transistors each having a gate, a source, and a drain, wherein for each of the plurality of field effect transistors, one of the plurality of control signals from the latching buffer enters the gate, and wherein the source of each of the plurality of field effect transistors is connected to the power source, and the drain of each of the plurality of field effect transistors is connected to one of the plurality of expansion slots.

4. A method for controlling power to a plurality of expansion slots of a computer system, the method comprising the steps of:

receiving and storing data from the computer system in a latching means;

outputting a plurality of control signals corresponding to the data received by the latching means;

receiving the plurality of control signals at a power controller, from the latching means, each of the plurality of control signals indicating a power-on or a power-off state for a corresponding expansion slot;

enabling the supply of a power source voltage to a first set of the plurality of expansion slots corresponding to those of the plurality of control signals that indicate a power-on state; and disabling the supply of the power source voltage to a second set of the plurality of expansion slots corresponding to those of the plurality of control signals that indicate a power-off state.

5. The method of controlling power as in claim 4, further including the steps of:

receiving a port address signal and an input-output write signal from the computer system; and outputting a signal corresponding to the port address signal and the input-output write signal.

6. The method of controlling power as recited in claim 4, wherein the first set of expansion slots includes all expansion slots that are filled and the second set of expansion slots includes all expansion slots that are empty.

* * * * *